United States Patent [19]

Farras Pinos

[11] Patent Number: 5,158,314
[45] Date of Patent: Oct. 27, 1992

[54] BICYCLE WITH TRACTION ON BOTH WHEELS

[76] Inventor: Francesc-Xavier Farras Pinos, Raimon d'Abadal, 30, 08500 VIC, Barcelona, Spain

[21] Appl. No.: 600,026

[22] Filed: Oct. 18, 1990

[30] Foreign Application Priority Data

Apr. 20, 1990 [ES] Spain .................................. 9001294

[51] Int. Cl.$^5$ .................................. B62M 1/02
[52] U.S. Cl. .................................. 280/259; 74/417; 280/260; 280/261
[58] Field of Search ............... 280/230, 236, 238, 259, 280/223, 212, 214, 260, 261; 74/417, 423

[56] References Cited

U.S. PATENT DOCUMENTS

| | | | |
|---|---|---|---|
| 599,048 | 2/1898 | Turner | 280/214 |
| 4,773,662 | 9/1988 | Phillips | 280/230 X |
| 5,004,258 | 4/1991 | Becoat | 280/259 |

*Primary Examiner*—Mitchell J. Hill
*Attorney, Agent, or Firm*—Ostrolenk, Faber, Gerb & Soffen

[57] ABSTRACT

A traction system for driving the front and rear wheels of a bicycle of the type including a gearshift connected to the rear wheel. The gearshift is coupled to a main drive chain which is driven by the pedals of the bicycle. A first auxiliary traction chain is coupled to the rear wheel such as to be driven by the rearwheel. A second auxiliary traction chain is coupled to the front wheel of the bicycle for driving the same. A flexible transmission formed of rigid and flexible shafts interconnected by cardan joints connects the first and second auxiliary traction chains so that motion of the rear wheel is coupled to the front wheel and both wheels are simultaneously driven.

5 Claims, 6 Drawing Sheets

BICYCLE WITH TRACTION ON BOTH WHEELS

BACKGROUND OF THE INVENTION

The present invention relates to a bicycle and, more particularly, a traction system for driving both wheels of a bicycle.

Traction at both wheels of a bicycle permits better transmission of the applied forces in order to permit greater ease of travel on slippery surfaces, for instance, for locomotion over iced or snow-coated surfaces, or when crossing a river on the bottom of which there may be slippery stones, etc. The two-wheel traction system makes it possible for the force applied to the pedals to be transmitted more gently and progressively, with larger gripping surface and with greater certainty of locomotion, eliminating the dangers of uncontrollable slippage of the rear wheel.

A traction system in accordance with the present invention can be applied to any type of bicycle with a gearshift, but is specifically advantageous for mountain bicycles. As is conventional, the bicycle includes a system or set of pedals of traditional construction as well as a gearshift consisting of a set of gears mounted on the axle of the rear wheel and driven by a main drive chain connected to the pedals.

In accordance with the present invention, the traction system comprises first and second auxiliary traction chains and a flexible intermediate transmission.

In one embodiment of the invention, the first auxiliary traction chain is mounted between the innermost sprocket of the gearshift and a first independent idler sprocket, the second auxiliary chain is mounted between a sprocket which is rigidly attached to the axle of the front wheel and a second independent idler sprocket, and the flexible intermediate transmission is connected between the first and second idler sprockets of the auxiliary chains.

The innermost sprocket of the gearshift is separated from the rest of the sprockets of said gearshift by a separation stop with a safety protector, thus preventing the danger of contact between the main drive chain and the first auxiliary traction chain.

The flexible intermediate transmission is formed of rigid and flexible shafts which are connected to each other and to transmission housings connected to the first and second auxiliary chains by cardan joints.

The first independent idler sprocket and a transmission associated with the sprocket are mounted on the tube of the frame which supports the seat. The second independent idler sprocket and a transmission associated with the sprocket are mounted on a support which is fastened to the front fork.

The arrangement of the different parts described will be better understood from the following description, given with reference to the accompanying drawings showing one exemplary embodiment.

Other features and advantages of the present invention will become apparent from the following description of the invention which refers to the accompanying drawings.

BRIEF DESCRIPTION OF THE DRAWINGS

FIG. 2a is an exploded view, with portions removed for the sake of clarity, of the gear shift shown in FIG. 2;

FIG. 6 shows a stop employed in the gear shift shown in FIGS. 2 and 2a; and

FIG. 7 shows a separation protector employed in the gear shift shown in FIGS. 2 and 2a.

DETAILED DESCRIPTION OF THE DRAWINGS

Figure 1:
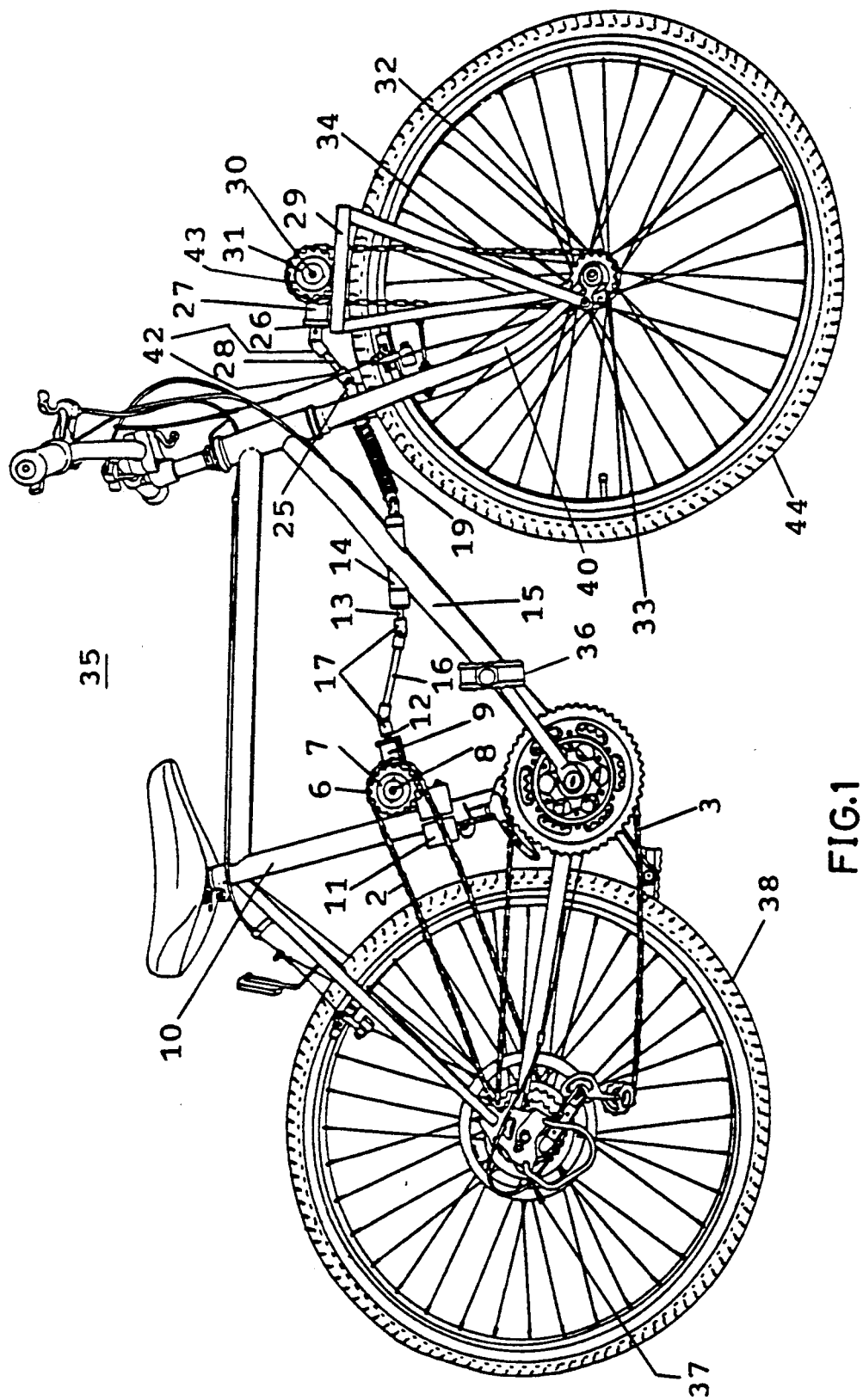
FIG. 1 is a side view of a bicycle constructed in accordance with the invention.

Referring to FIG. 1, there is shown a bicycle 35 which includes a system or set of pedals 36 of conventional construction and a gearshift 37, also of traditional construction, mounted on the axle of the rear wheel 38.

Figure 2:
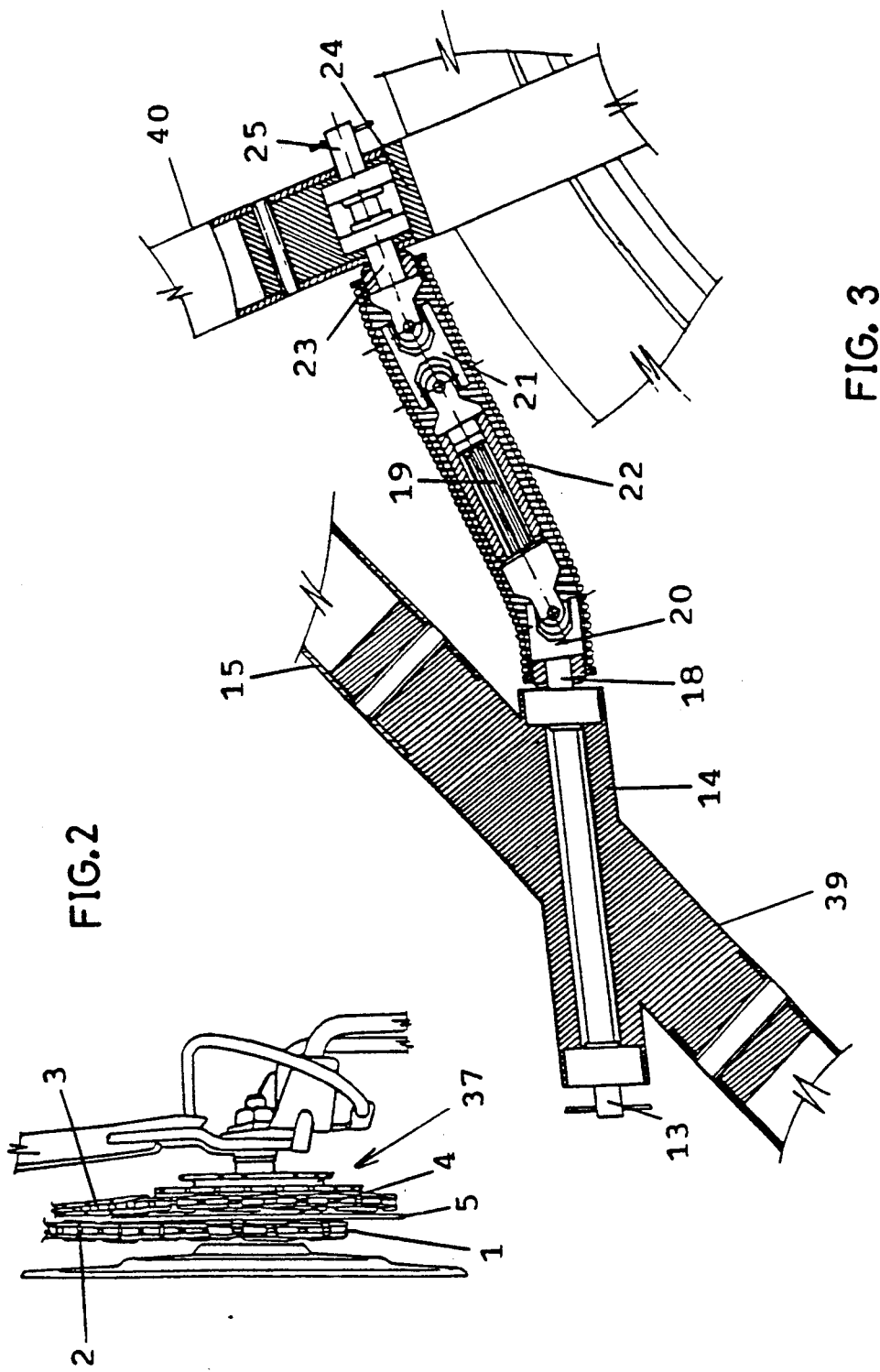
FIG. 2 is a partial end view with portions removed for the sake of clarity of the gearshift of the bicycle.
Figure 6:
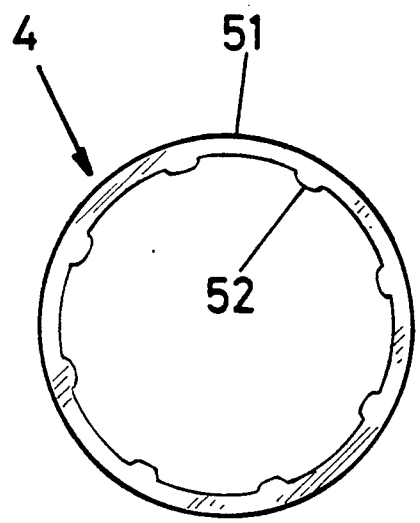
Figure 7:
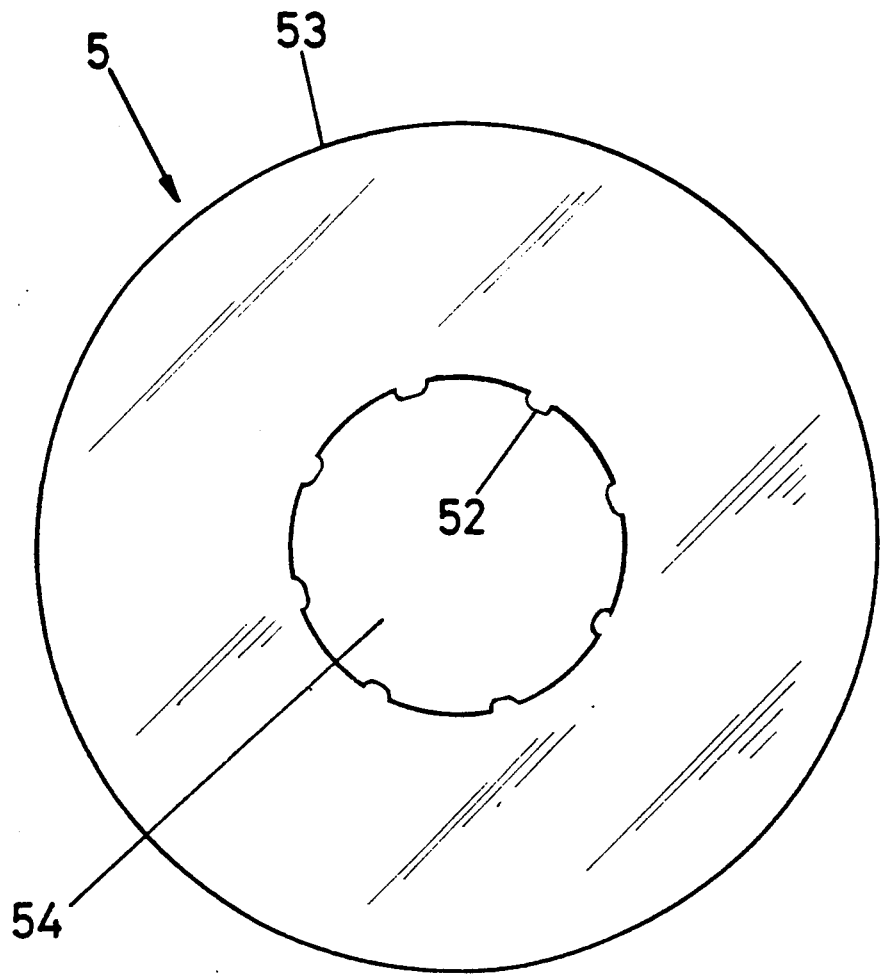

As best seen in FIG. 2 and 2a in accordance with the present invention, a first auxiliary traction chain is coupled to the innermost sprocket 1 of the gearshift, i.e., the sprocket closest to the hub of the rear wheel 38. The auxiliary chain 2 is separated from the main drive chain 3 which is to the pedals 36 by an intermediate stop 4 (FIG. 6) with a separation protector 5 (FIG. 7). The stop 4 is accommodated in the conventional gear shift 37 by replacing one of its sprockets. The stop 4, together with the protector 5, prevents accidental contact between the first auxiliary traction chain 2 and the main drive chain 3. The first auxiliary traction chain 2 is mounted on the innermost sprocket 1 of the set of sprockets of the gearshift 37, followed by the stop 4 and then the rest of the sprockets, in the order of the largest to the smallest.

Referring again to FIG. 1, the first auxiliary traction chain 2 extends between the innermost sprocket 1 of the gearshift 37, and a first independent idler sprocket 6, which is mounted on a pinion 7, the axle 8 of which constitutes the input of a transmission 9. The sprocket 6, the pinion 7 and the transmission 9 are mounted on a vertical tube 10 of the bicycle 35 by means of a support 11.

Figure 4:
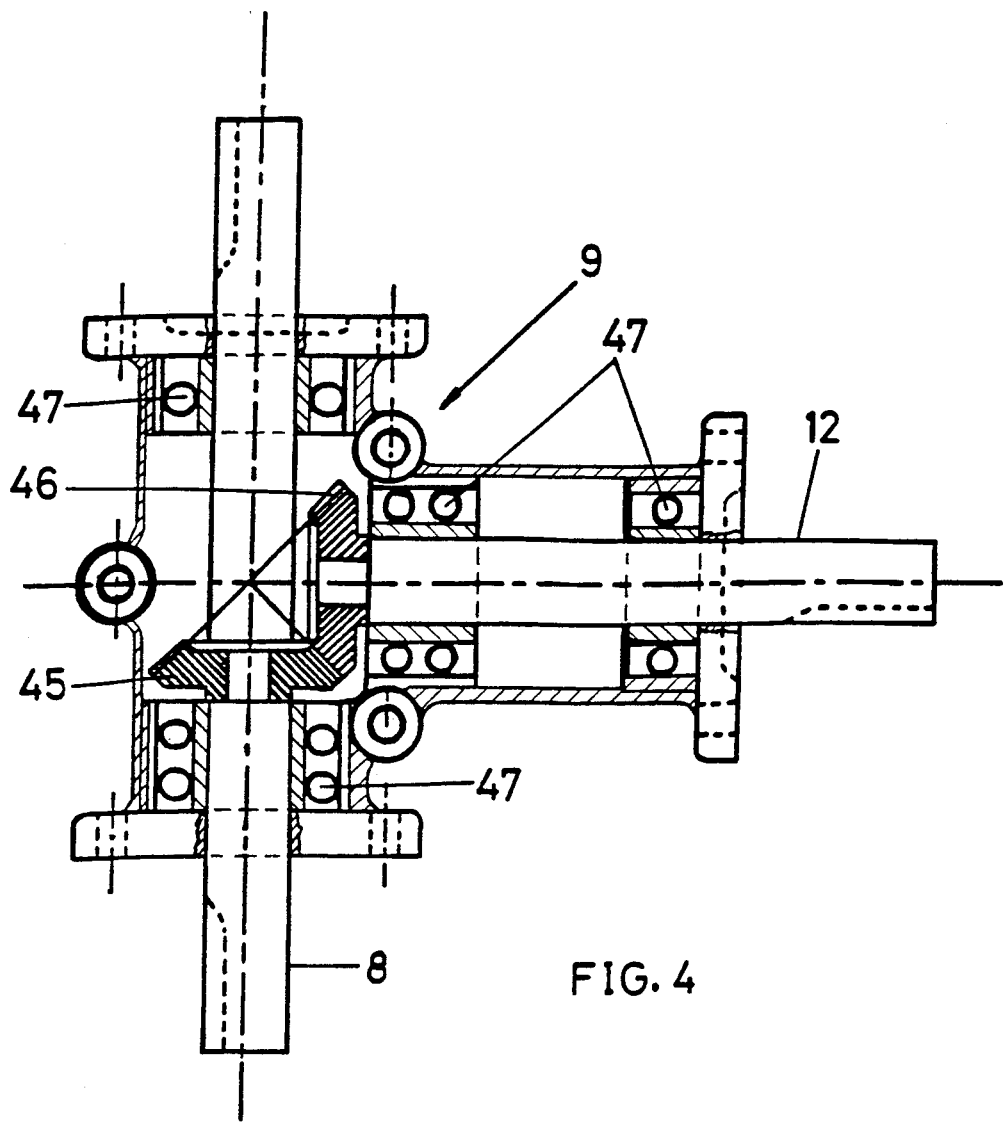
FIG. 4 is an enlarged sectional view, with portions removed for the sake of clarity, of one of the transmissions employed in the bicycle to redirect transmission at an angle of 90°.

The transmission 9 includes an output shaft 12 which is at an angle of 90° with respect to the input axle 8 and which is connected to an input shaft 13 of a transmission unit 14, which unit extends through a tube 15 of the bicycle 35 and is rotatably mounted thereto by a ball bearing assembly 39. As shown in FIG. 4, the transmission 9 includes a first bevel gear mounted on the shaft 8 and a second bevel gear 46 in mesh with the gear 45 mounted on the shaft 12. As is conventional, bearings 47 are provided to facilitate rotation. Transmission between the shafts 12 and 13 is effected by means of a rigid shaft 16 and intermediate universal joints 17-17.

Figure 3:
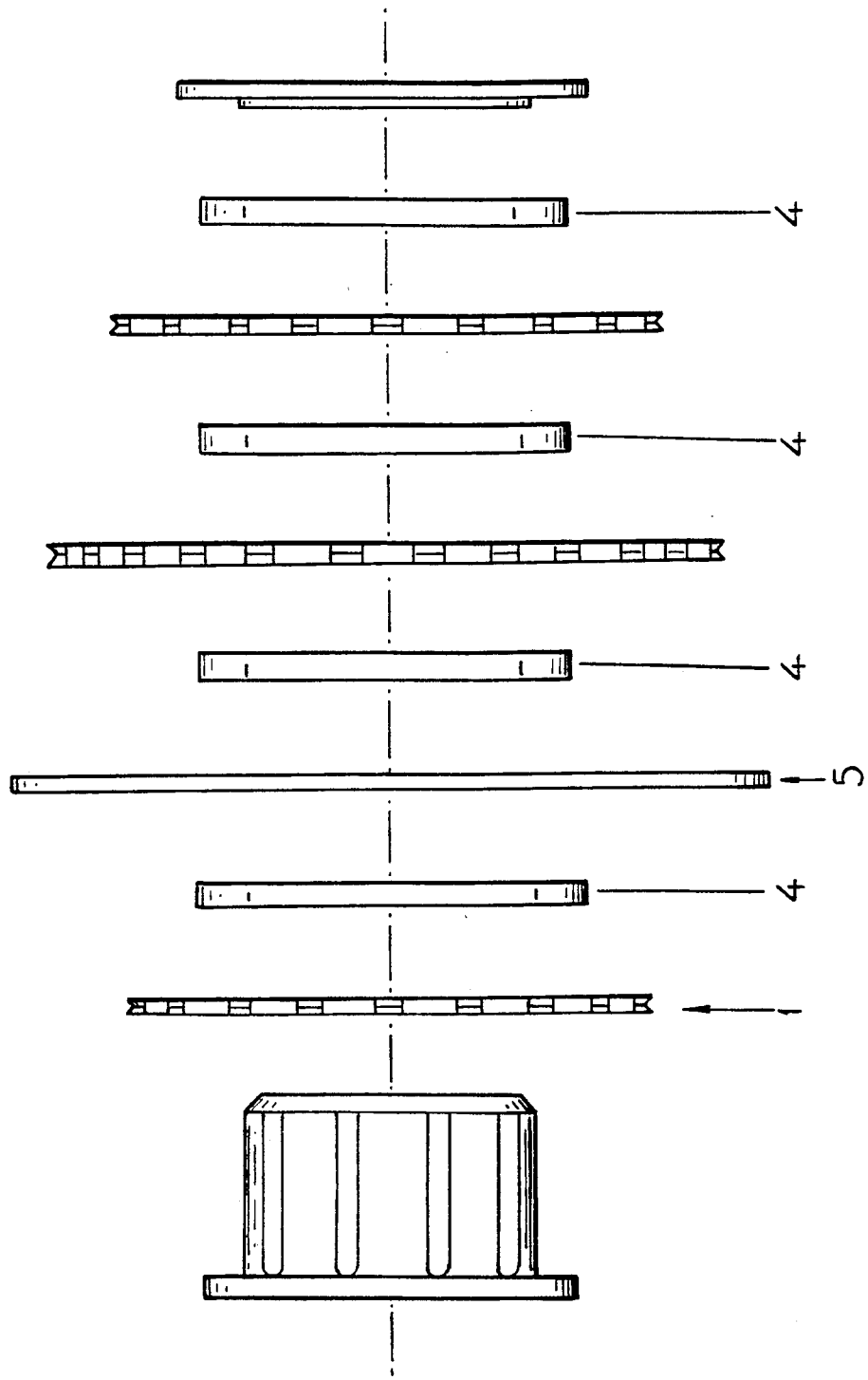
FIG. 3 is a section, on a larger scale, showing how the intermediate transmission extends through the front fork and a tube of the frame of the bicycle.

Referring to FIG. 3, the transmission unit includes an output shaft 18 fastened to an extendable cardan unit 19 which includes a simple universal joint 20 in the rear part and a double universal joint 21 in the front. The extendable cardan unit 19 is protected by an outer spring 22 which tends to maintain the unit under tension. The double universal joint 21 is connected to a shaft 23 which constitutes the input shaft of a ball bearing assembly 24 which is housed in the center of the front fork 40 of the bicycle 35.

Figure 5:
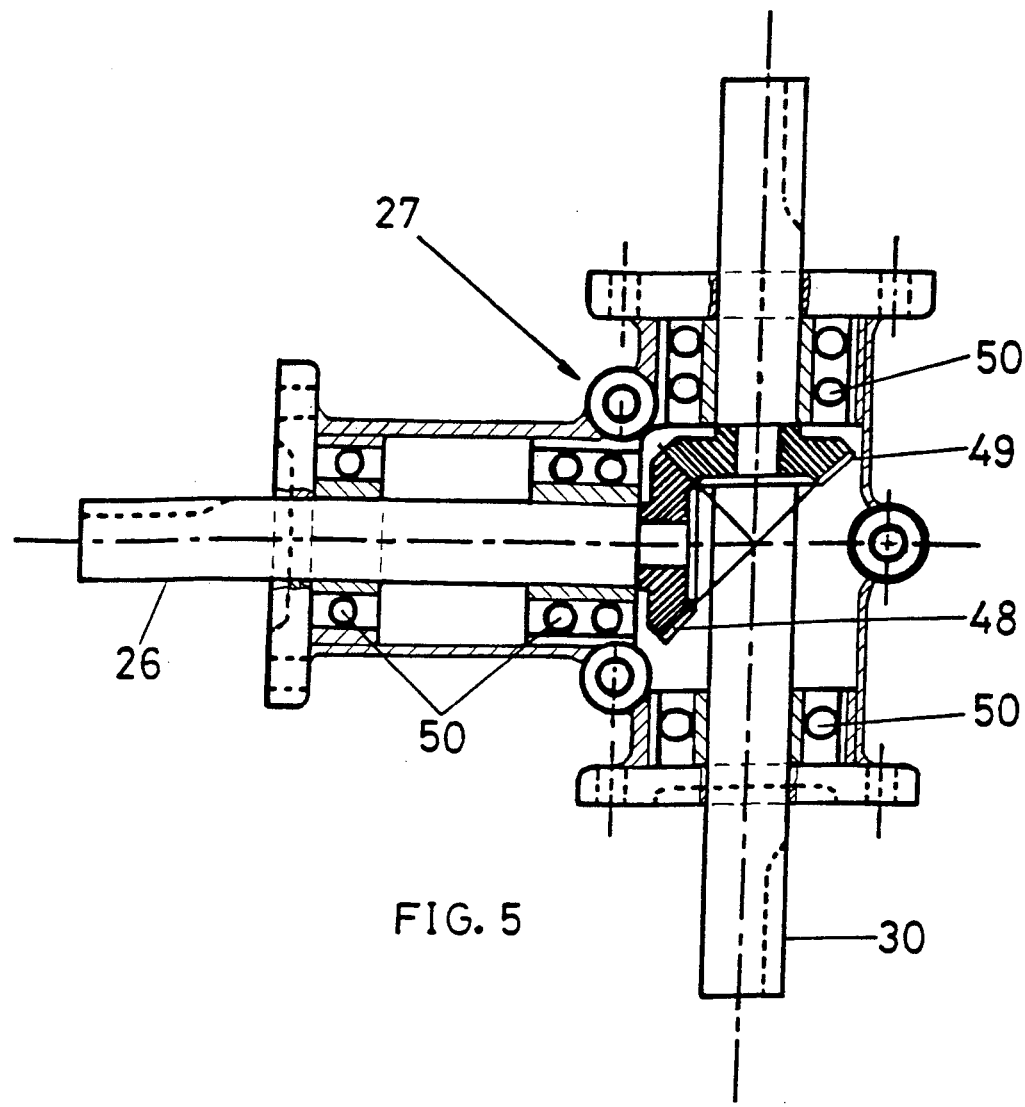
FIG. 5 is an enlarged sectional view, with portions removed for the sake of clarity, of a second transmission employed in the bicycle to redirect transmission at an angle of 90°.

Referring back to FIG. 1, the output shaft 25 is connected to an input shaft 26 of a transmission 27, by means of a rigid shaft 28 and end universal joints 42-42. The transmission 27 is fastened to a support 29 which, in turn, is fastened on the front fork 40. A pinion 43 and sprocket 31 are mounted on an output shaft 30 of the transmission 27, the output shaft 30 being at an angle of 90° to the input shaft 26. As shown in FIG. 5, the transmission 27 includes a first bevel gear 48 mounted on the shaft 26 and a second bevel gear 49 in mesh with the gear 48 and mounted on the shaft 30. Like the transmission 9, the transmission 27 includes bearings 50 to facilitate rotation. A second auxiliary traction chain 34 is coupled to the sprocket 31 and a sprocket 32. The sprocket 32 is mounted on a pinion 33 mounted on the hub of the front wheel 44.

With the system described, the force of traction transmitted to the rear wheel 38 of the bicycle from the set of traditional pedals 38 is transmitted also via the first auxiliary chain 2, the intermediate transmission units and the second auxiliary chain 34 to the front wheel 44, thus obtaining sure traction for both wheels. More specifically, the sprocket 1, which rotates with the rear wheel 38, drives the auxiliary chain 2 which, in turn, causes rotation of the sprocket 6, the pinion 7 and the input axle 8 to the transmission 9. Rotation of the input axle 8 causes the output shaft 12 of the transmission unit 9, which is at an angle of 90°, to also rotate. The rotation of the output shaft 12 is coupled to the shaft 16 through the universal joint 17 connected to the left end, as viewed in FIG. 1, of the shaft 16. Rotation of the shaft 16, in turn, is coupled to the universal joint 17 connected to the right end of the shaft 16, as viewed in FIG. 1, and, thereby, to the input shaft 13 of the transmission 14. This rotation is then transmitted from the output shaft 18 of the transmission unit 14 to the universal joint 20 of the extendable cardan unit 19 to cause the same to rotate. This rotation is then coupled through the double universal joint 21 to the shaft 23 of the ball bearing assembly 24 to rotate the output shaft 25 of the ball bearing assembly. In turn, this causes rotation of the rigid shaft 28 through the universal joint 42 connected to the left end, as viewed in FIG. 1, of the shaft 28. Rotation of the shaft 28 is transmitted to the input shaft 26 of the transmission 27 through the universal joint 42 connected to the right end, as viewed in FIG. 1, of the shaft 28. The transmission 27 causes a 90° shift in direction of the rotation of the input shaft 26 to thereby rotate the output shaft 29 of the transmission unit 27 and, hence, the pinion 30 and the sprocket 31. Rotation of the sprocket 31 drives the chain 34 which then drives the front wheel 44 through the sprocket 32 and the pinion 33.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A traction system for a bicycle of the type having a frame, front and rear wheels connected to the frame, pedals, a gear shift on the rear wheel, including a plurality of sprockets, and a main drive chin coupled from the pedals to the fear shift to rotate the rear wheel, said traction system comprising:
    a first auxiliary traction chain coupled to the innermost sprocket of the gear shift and driven by rotation of the rear wheel;
    a second auxiliary traction chain coupled to the front wheel to rotate the same;
    means including a flexible transmission for coupling movement of the first auxiliary traction chain to movement of the second auxiliary traction chain to thereby drive the front wheel of the bicycle simultaneously with the rear wheel, said means including a first idler sprocket connected to the first auxiliary traction chain and rotatably mounted to the frame of the bicycle, a second idler sprocket connected to the second auxiliary traction chain and rotatably mounted to the bicycle and means including a flexible transmission for coupling rotation of the first idler sprocket to the second idler sprocket; and
    a separating stop and a separation protector for separating the innermost sprocket of the gear shift from the rest of the sprockets of the gear shift.

2. A traction system according to claim 1, in which the flexible transmission includes a plurality of rigid and flexible shafts interconnected by means of cardan joints.

3. A traction system according to claim 1, in which the bicycle includes a seat supported on the frame, the frame includes a front fork and a support is fastened to the front fork; and in which the first idler sprocket is rotatably mounted on the portion of the frame which supports the seat and the second independent sprocket is rotatably mounted on the support fastened to the front fork.

4. A traction system for a bicycle of the type having a frame, front and rear wheels connected to the frame, pedals, a gear shift on the rear wheel, including a plurality of sprockets, and a main drive chain coupled from the pedals to the gear shift to rotate the rear wheel, said traction system comprising:
    a first auxiliary traction chain coupled to the rear wheel so as to be driven thereby;
    a second auxiliary traction chain coupled to the front wheel to rotate the same; and
    means for transmitting motion between the first and second auxiliary traction chains, said means including a first idler sprocket connected to the first auxiliary traction chain and rotatably mounted to the frame of the bicycle, a second idler sprocket connected to the second auxiliary traction chain and rotatably mounted to the frame of the bicycle and means including a flexible transmission for coupling rotation of the first idler sprocket to the second idler sprocket.

5. A traction system according to claim 4, in which the flexible transmission includes a plurality of rigid and flexible shafts interconnected by means of cardan joints.

* * * * *